(12) United States Patent
Wang et al.

(10) Patent No.: US 11,344,950 B2
(45) Date of Patent: May 31, 2022

(54) APPARATUS AND METHOD FOR PREPARING SPHERICAL METAL POWDER BASED ON ONE-BY-ONE ATOMIZATION METHOD FOR UNIFORM DROPLETS

(71) Applicants: Xiaoming Wang, Beijing (CN); Yang Zhao, Beijing (CN); Qing Chang, Beijing (CN); Zhiqiang Ren, Beijing (CN); Sheng Zhu, Beijing (CN); Wenyu Wang, Beijing (CN); Jing Shi, Beijing (CN); Guofeng Han, Beijing (CN); Tao Teng, Beijing (CN); Dongyang Wang, Beijing (CN); Zhanwu Peng, Beijing (CN); Zhiyong Qin, Beijing (CN); DALIAN UNIVERSITY OF TECHNOLOGY, Liaoning (CN)

(72) Inventors: Xiaoming Wang, Beijing (CN); Yang Zhao, Beijing (CN); Qing Chang, Beijing (CN); Wei Dong, Liaoning (CN); Fumin Xu, Liaoning (CN); Zhiqiang Ren, Beijing (CN); Sheng Zhu, Beijing (CN); Wenyu Wang, Beijing (CN); Jing Shi, Beijing (CN); Guofeng Han, Beijing (CN); Tao Teng, Beijing (CN); Yao Meng, Liaoning (CN); Zhaofeng Bai, Liaoning (CN); Yanyang Wang, Liaoning (CN); Yang Han, Liaoning (CN); Guobin Li, Liaoning (CN); Dongyang Wang, Beijing (CN); Zhanwu Peng, Beijing (CN); Zhiyong Qin, Beijing (CN)

(73) Assignees: Xiaoming Wang, Beijing (CN); Yang Zhao, Beijing (CN); Qing Chang, Beijing (CN); Zhiqiang Ren, Beijing (CN); Sheng Zhu, Beijing (CN); Wenyu Wang, Beijing (CN); Jing Shi, Beijing (CN); Guofeng Han, Beijing (CN); Tao Teng, Beijing (CN); Dongyang Wang, Beijing (CN); Zhanwu Peng, Beijing (CN); Zhiyong Qin, Beijing (CN); DALIAN UNIVERSTTY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/280,168

(22) PCT Filed: Sep. 25, 2019

(86) PCT No.: PCT/CN2019/107701
§ 371 (c)(1),
(2) Date: Mar. 25, 2021

(87) PCT Pub. No.: WO2020/063623
PCT Pub. Date: Apr. 2, 2020

(65) Prior Publication Data
US 2021/0308764 A1   Oct. 7, 2021

(30) Foreign Application Priority Data
Sep. 25, 2018  (CN) .......................... 201811117136.5

(51) Int. Cl.
| | | |
|---|---|---|
| *B22F 9/10* | (2006.01) | |
| *B22F 1/065* | (2022.01) | |
| *B33Y 70/00* | (2020.01) | |

(52) U.S. Cl.
CPC ................ *B22F 9/10* (2013.01); *B22F 1/065* (2022.01); *B22F 2201/11* (2013.01); *B22F 2301/10* (2013.01); *B33Y 70/00* (2014.12)

(58) Field of Classification Search
CPC ...... B22F 9/10; B22F 1/0048; B22F 2301/10; B22F 2201/11; B22F 1/065; B22F 2999/00; B33Y 70/00
See application file for complete search history.

(56) References Cited

U.S. PATENT DOCUMENTS

| | | |
|---|---|---|
| 2,310,590 A | 2/1943 | Marette |
| 4,323,523 A | 4/1982 | Ueda et al. |

FOREIGN PATENT DOCUMENTS

| | | | |
|---|---|---|---|
| CN | 104525961 A | | 4/2015 |
| CN | 104550990 A | * | 4/2015 |

(Continued)

*Primary Examiner* — Rebecca Janssen
(74) *Attorney, Agent, or Firm* — Novick, Kim & Lee, PLLC; Allen Xue

(57) ABSTRACT

An apparatus includes a housing, a crucible disposed in the housing, and a collection bin. A turnplate disposed in a powder collection area is of an inlaid structure. A concentric circular groove is provided on the atomization plane. An air (Continued)

hole is provided in the turnplate. The present invention combines the pulsated orifice ejection method and the centrifugal atomization method, in cooperation with the turnplate structure and subjecting the turnplate surface to induction heating, so that a metal liquid is allowed to break through the split mode of traditional molten metal, achieves a fibrous split mode that can be implemented only when an atomizing medium is an aqueous or organic solution, and prepares a high-melting-point metal powder that meets requirements, and has a controllable particle size, high sphericity, no satellite droplets, and good flowability and spreadability, and is suitable for industrial production.

12 Claims, 2 Drawing Sheets

(56) References Cited

FOREIGN PATENT DOCUMENTS

| | | | | |
|---|---|---|---|---|
| CN | 104550990 A | | 4/2015 | |
| CN | 104588674 A | | 5/2015 | |
| CN | 107350477 A | | 11/2017 | |
| CN | 107570721 A | | 1/2018 | |
| CN | 104588673 B | * | 3/2018 | |
| CN | 109093127 A | | 12/2018 | |
| GB | 754180 A | * | 8/1956 | ................ B22F 9/10 |
| GB | 754180 A | | 8/1956 | |
| JP | 2004211155 A | | 7/2004 | |
| JP | 2009062573 A | | 3/2009 | |
| JP | 2012117117 A | | 6/2012 | |

* cited by examiner (a)                        (b)

APPARATUS AND METHOD FOR PREPARING SPHERICAL METAL POWDER BASED ON ONE-BY-ONE ATOMIZATION METHOD FOR UNIFORM DROPLETS

FIELD OF TECHNOLOGY

The present disclosure relates to the technical field for preparing spherical metal powder, and specifically relates to an apparatus and a method for preparing spherical metal powder based on one-by-one atomization method for uniform droplets.

BACKGROUND ART

In recent years, materials have gradually developed in a direction of lightness, miniaturization, and integration. Spherical powder materials have been widely used in areas such as electronic packaging, energy materials, and biomedicine. Internationally, processing manners are constantly changing. A new rapid forming technology of 3D printing comes into being and is continuously developed in research. For the forming technology based on the concept of additive manufacturing, physical materials are manufactured by using adhesive materials, such as powdered metal, through layer-by-layer printing. Metal powder for 3D printing requires high sphericity, a narrow particle size distribution interval, no satellite droplets, good spreadability, uniform flowability, and the like. In addition, demand for the spherical metal powder for 3D printing is also continuously increasing.

At present, main domestic and foreign methods for industrially preparing spherical metal powder are atomization method, including gas atomization method, water atomization method, and centrifugal atomization method, etc. However, powder prepared by using the atomization method has large size dispersity, and powder that meets a particle size requirement can be obtained only through screening a plurality of times, which greatly reduces the production efficiency, especially when the size requirement is strictly made. Satellite droplets are easily produced by using the atomization method, and a surface of the powder is made to adhere to the satellite droplet, thereby reducing the flowability and spreadability of the powder. In this case, requirements on the powder for 3D printing cannot be met. Other methods such as shredding method, perforating and remelting method, and uniform droplet forming method are limited to preparation of metal powder with a low melting point. A method for preparing spherical metal powder with a high melting point is currently in demand.

The foregoing commonly used methods all have certain technical limitations. Therefore, it is necessary to provide a method and an apparatus for preparing spherical metal powder with a high melting point, to resolve the technical problem of preparing powder for 3D printing.

SUMMARY OF THE INVENTION

For the foregoing problems of poor sphericity, spreadability, and flowability that are put forward in the process of preparing metal powder for 3D printing, an apparatus and a method for preparing spherical metal powder based one-by-one atomization method for uniform droplets is provided. A pulsated orifice ejection method and a centrifugal atomization method are mainly combined. In addition, the structure of the turnplate is designed, and an induction heating coil is added to perform induction heating on a surface of the circular plate, so that a metal liquid overcomes its own limitations of high density and low viscosity, and breaks through a traditional split mode of molten metal, thereby implementing a fibrous split mode that can be implemented only when an atomizing medium is an aqueous or organic solution. In this mode, the ultra-fineness of metal powder is implemented, and a leap forward can be made in particle size control. Spherical metal powder with high sphericity, good flowability and spreadability, no satellite droplets, and a very high fine powder yield that meets requirements of 3D printing may be obtained through preparation by using the method.

The present invention uses the following technical means:

An apparatus for preparing spherical metal powder based on one-by-one atomization method for uniform droplets is provided, including a housing, a crucible disposed in the housing, and a collection bin disposed under the housing. The crucible is disposed at an upper portion of the housing, and the collection bin is disposed under the crucible.

A transmission rod connected to a piezoelectric ceramic disposed outside the housing is disposed in the crucible. A position where the transmission rod is connected to a top portion of the crucible is sealed by a dynamic sealing ring. A lower end of the transmission rod faces towards a center hole at a bottom portion of the crucible, and a washer with a plurality of small holes is fixed at a bottom portion of the center hole. a thermocouple is disposed in the crucible, and a resistive heater is disposed outside the crucible.

A crucible air inlet extending into the crucible and a crucible exhaust valve are disposed at a top portion of the housing. A diffusion pump and a mechanical pump are disposed on the side wall of the housing. A cavity air inlet and a cavity exhaust valve are disposed on the housing. A furnace door is disposed on a side of the housing.

The collection bin is fixedly connected with the housing through a support. A through ring-shaped pipe is disposed in the collection bin and right below the through ring-shaped pipe. The turnplate is connected to a motor. A collection tray is disposed at the bottom portion of the collection bin, and a collection bin door is disposed on a side of the collection bin.

The turnplate includes a base, an atomization plane, and an air hole.

The base is a structure with a "T-shaped" longitudinal section constituted of an upper receiving portion and a lower support portion. An upper surface of the receiving portion is provided with a circular groove having a certain radius which is coaxial with the center of the receiving portion. The base is made of a material with a thermal conductivity of less than 20 W/m/k.

The atomization plane is of a disc structure, matching the circular groove and in interference fitting with the circular groove. The atomization plane is made of a material with wetting angle less than 90° to an atomized droplet. The atomization plane is provided with a concentric circular groove in the center of the atomization plane, the concentric circular groove matching with the washer with a plurality of small holes and into which the metal droplets fall and is stored.

The air hole is disposed passing through the receiving portion and the support portion. An upper end surface of the air hole is in contact with a lower end surface of the atomization plane, and a lower end of the air hole is communicated with the outside.

Induction heating coils are also disposed outside the turnplate.

To facilitate addition of raw materials and collection of finished products, a furnace door is disposed on a side of the housing, and a collection bin door is disposed on a side of the collection bin. A connection part between the transmission rod and the top portion of the crucible is sealed by a dynamic sealing ring. The transmission rod extends into a cavity of the crucible and the melt, and the melt is driven by the transmission rod to eject from the washer with a plurality of small holes to form droplets. The droplets fall freely through a ring-shaped pipe into the concentric circular groove in the center of the turnplate. Under the action of centrifugal force, the droplets spread over the concentric circular groove, spread and split fibrously, and finally dispersed into tiny droplets at the edge of the turnplate to fly out, solidify during free falling to form metal powder. The metal powder finally lands in a collection tank. An area of the collection tank is large enough to completely collect the metal powder, a height of the collection bin is such that the liquid droplets can complete solidification when they fall freely after centrifugation, and a width of the collection bin is greater than a flying distance of the droplets broken through centrifugation. That is, after being broken through centrifugation, the droplets solidify into metal powder in the falling process and fall into the collection tank.

Preferably, a height of the support portion of the base should not be too high, which should smaller than a height of the receiving portion. An upper end surface of the atomization plane protrudes from an upper end surface of the receiving portion, and a protrusion height ranges from 0.1 mm to 0.5 mm. The protrusion height should meet the following requirement: dispersed metal droplets directly fly into the cavity without touching the base and fall into the collection tray. The base is made of zirconia ceramics, silica glass, stainless steel, or other materials which have a thermal conductivity of less than 20 W/m/k. The upper end surface of the air hole is less than or equal to the lower end surface of the atomization plane. The air hole is provided to vacuumize the gap in the turnplate more thoroughly during vacuumizing, so that the turnplate is safer when rotating at a high speed. Therefore, the larger the contact area between the upper end surfaces of the air hole and the lower end surface of the atomization plane, the better the higher stability of the atomization plane during vacuumizing.

Further, a diameter of the center hole of the crucible is larger than that of the small hole of the washer with a plurality of small holes, and the diameter of the small hole of the washer with a plurality of small holes ranges from 0.02 mm to 2.0 mm.

Further, a wetting angle between a material of the washer with a plurality of small holes and the melt disposed in the crucible is greater than 90°.

Further, a rotational speed of the turnplate is 10000 rpm to 40000 rpm.

Further, a heating thickness of the induction heating coil ranges from 5 mm to 20 mm, and the induction heating coil is connected with a converter and a regulated power supply that are disposed outside the housing, and a voltage control of the regulated power supply ranges from 0 V to 50 V.

Further, the piezoelectric ceramic, the transmission rod, the crucible, the resistive heater, the washer with a plurality of small holes, the ring-shaped pipe, the turnplate, the concentric circular groove, and the induction heating coil are located on a same axis from top to bottom of the apparatus.

The present invention also provided a method for preparing spherical metal powder based on one-by-one atomization method for uniform droplets by using the apparatus, including the following steps:

S1. charging: grinding a raw material to a preset average particle size and then charging the raw material into the crucible for sealing;

S2. vacuumizing and heating: vacuumizing the crucible and the housing by using the mechanical pump and the diffusion pump, and filling the crucible and the housing with a high-purity inert gas; setting a heating power of a resistive heater based on a melting point of the raw material to-be-heated, and after a heating temperature reaches the melting point, completely melting the raw material into a melt; manually adjusting a position of the transmission rod, until a preset distance exists between the transmission rod and the washer with a plurality of small holes;

S3. induction heating: with a rotational speed preset, enabling the turnplate rotate at a high speed by using the motor, and then heating an upper surface of the turnplate rotating at the high speed, to a temperature higher than a melting-point of a metal material by using the induction heating coil, to obtain a melt;

S4. preparing the powder: firstly, manually adjusting the position of the transmission rod to the preset distance from the washer with a plurality of small holes; secondly, injecting a high-purity inert protective gas into the crucible by using the crucible air inlet disposed on the housing and extending into the crucible, to form a positive pressure difference between the inside and the outside of the crucible, thereby driving the melt to fill the center hole at the bottom portion of the crucible; and finally, inputting a pulse signal with a wave pattern to the piezoelectric ceramic, where the piezoelectric ceramic produces a downward displacement, which is transferred by the transmission rod connected to the piezoelectric ceramic to the molten metal in the vicinity of the center hole, so that the molten metal is ejected from the washer with a plurality of small holes at the bottom portion of the center hole, to form uniform droplets;

S5. forming the powder: the uniform droplets falling through the ring-shaped pipe and landing freely on the turnplate rotating at the high speed; the molten uniform droplets in a molten state first dropping in the concentric circular groove in the center of the turnplate, and gradually spreading over the groove; because centrifugal force is small at this time, the droplets will not dispersed immediately, but will spread in a circle on the turnplate; when the droplets spread in a certain range and the centrifugal force is large enough, spread metal will disperse on the turnplate in a fiber line shape to an edge of the turnplate under the action of centrifugal force, and finally split into tiny droplets to fly out; the tiny droplets solidifying without a container in a falling process to form the metal powder, and the metal powder falling onto the collection tray; and S6. collecting the powder: after the preparation is completed, stopping the heating of the resistive heater, and the heating of the induction heating coil, and stopping the rotation of the turnplate, turning off the mechanical pump and the diffusion pump, closing the cavity air inlet, cavity exhaust valve, crucible air inlet, and crucible exhaust valve, opening the collection bin door, and taking out the metal powder in the collection tray.

Further, the raw material is charged into the crucible through the furnace door, and a quantity of the charged raw materials accounts for ¼ to ¾ of a capacity of the crucible.

Further, a position of the transmission rod is manually adjusted, until a distance between the transmission rod and the washer with a plurality of small holes is 2 cm to 5 cm.

Further, an induction heating voltage of the induction heating coil ranges from 0 V to 50 V, and an induction heating time ranges from 5 min to 15 min.

Further, a pressure difference between a crucible cavity of the crucible and a cavity of the housing ranges from 0 kPa to 200 kPa.

Compared with the prior art, the present invention has the following advantages:

The present invention designs an apparatus that combines a pulsated orifice ejection method and a centrifugal atomization method, which can realize the fibrous splitting of metal droplets on the turnplate, so as to realize preparation of fine spherical metal powder with a high melting point. The turnplate disclosed in the present invention is of an inlaid structure, wherein a material with a relatively poor thermal conductivity (less than 20 W/m/k) is selected as the base, which can effectively reduce heat transferred from the turnplate to a high-speed motor, thereby preventing the turnplate from affecting normal running of the high-speed motor. A metallic material with a wetting angle with respect to atomized melt of less than 90° is selected as the atomization plane of the turntable, which facilitates droplets spreading on the atomization plane, so as to atomize the metal liquid fully.

A metal material with a high melting point melted in the crucible is ejected through the small holes at the bottom portion of the crucible under the action of the pressure difference and pulse disturbance, to form uniform droplets. The uniform molten droplets first drop in the concentric circular groove in the center of the turnplate and gradually spread over the groove. Because the material of the atomization plane of the turnplate has good wettability with the metal droplets and the centrifugal force in the center of the turnplate is small, the droplets are not dispersed immediately, but spread in a circle on the turnplate. When the droplets spread in a certain range and the centrifugal force is large enough, spread metal is dispersed on the turnplate in a fiber line shape to the edge of the turnplate under the action of centrifugal force, and is finally split into tiny droplets flying out. The tiny droplets solidify without a container in a falling process to form the metal powder. The pulsated orifice ejection method can overcome shortcomings of other methods in ejection of metal with a high melting point, thereby implementing ejection of uniform droplets of the metal with a high melting point. In addition, the ejected droplets have high sphericity and no satellite droplets. Combination of the pulsated orifice ejection method and the atomization method greatly reduces the size of the atomized droplets, improves the atomization efficiency, implement ultra-fineness of the metal powder, and the particle size is controllable, which has a high yield and meet the industrial production requirements.

The method of the present invention is highly controllable, which is shown in the following aspects: A heating temperature of the crucible can be accurately controlled by using the resistive heater. A pressure difference between the crucible and the housing can be controlled by injecting an inert gas into the crucible and the housing. The size of the droplets may be controlled based on a size of the small hole of the washer with a plurality of small holes at the bottom portion of the crucible; after centrifugal atomization, particle size distribution of fine metal particles can be further controlled. The induction heating coil can control a temperature of the surface of the turnplate and the rotational speed of the turnplate can be controlled, which can control a fibrous splitting effect of the molten metal, thereby further controlling the particle size distribution of the fine metal particles. The process parameters can be adjusted and controlled to obtain spherical metal powder meeting different requirements of particle sizes and distribution, and the production efficiency is improved.

Based on the present invention, the spherical metal powder with a high melting point can be efficiently prepared with a fine and controllable particle size, a narrow particle size distribution interval, high sphericity, no satellite droplets, good flowability and spreadability, high production efficiency, and low costs. In this case, the present invention is suitable for industrial production.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other accompanying drawings from these accompanying drawings without creative efforts.

Figure 1:
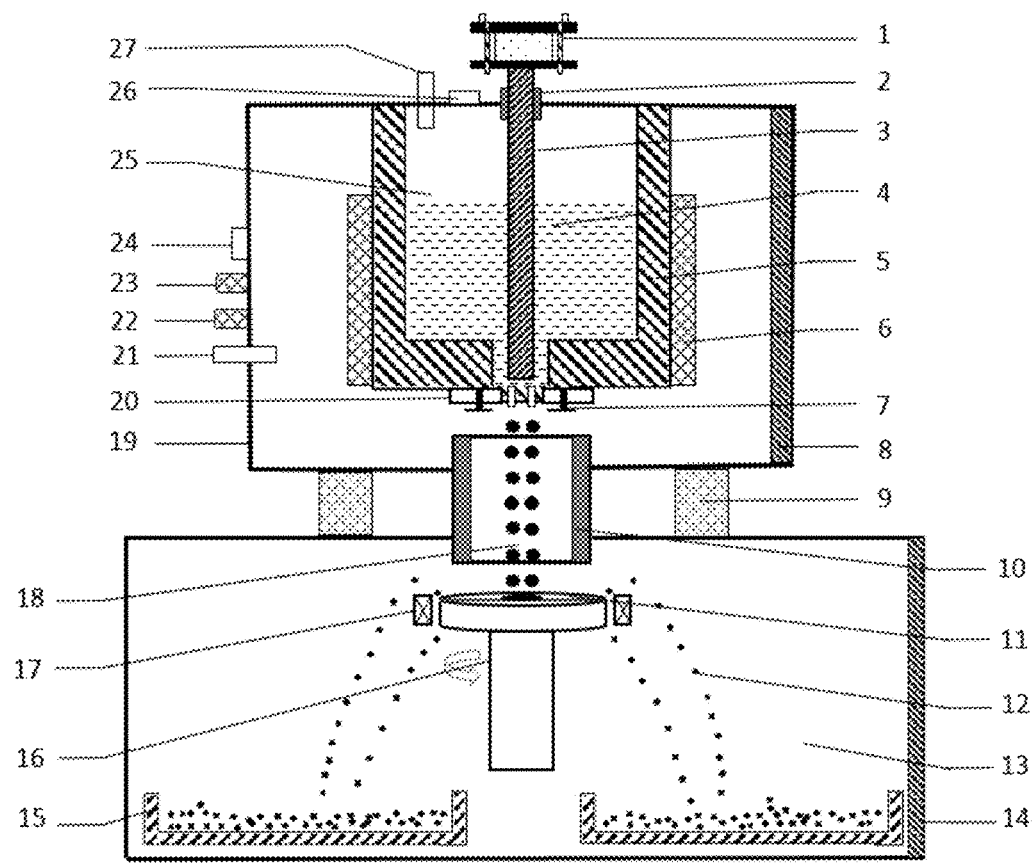
FIG. 1 is a schematic structural diagram of the present invention.

Wherein, in the figures: 1. piezoelectric ceramic; 2. dynamic sealing ring; 3. transmission rod; 4. melt; 5. crucible; 6. resistive heater; 7. screw; 8. furnace door; 9. support; 10. ring-shaped pipe; 11. turnplate; 12. metal powder; 13. collection bin; 14. collection bin door; 15. collection tray; 16. motor; 17. induction heating coil; 18. droplet; 19. housing; 20. washer with a plurality of small holes; 21. cavity air inlet; 22. mechanical pump; 23. diffusion pump; 24. cavity exhaust valve; 25. crucible cavity; 26. crucible exhaust valve; 27. crucible air inlet; 28. receiving portion; 29. support portion; 30. atomization plane; 31. air hole; 32. concentric circular groove.

DESCRIPTION OF THE EMBODIMENTS

It should be noted that, in the case of no conflicts, the embodiments and the features in the embodiments of the present invention can be combined mutually. The present invention will be described in detail below with reference to the accompanying drawings and the embodiments.

To make the objectives, technical solutions, and advantages of the present invention clearer, the following clearly and completely describes the technical solutions in the embodiments of the present invention with reference to the accompanying drawings in the embodiments of the present invention. Apparently, the described embodiments are merely some rather than all of the embodiments. The following description of at least one exemplary embodiment is actually only illustrative, and in no way serves as any limitation on the present invention and its application or use. Based on the embodiments of the present invention, all the other embodiments obtained by those of ordinary skill in the art without inventive effort are within the protection scope of the present invention.

It should be noted that the terms used herein are only intended to describe specific implementations and are not intended to limit the exemplary implementations of the present invention. As used herein, unless indicated obviously in the context, a singular form is intended to include a plural form. Furthermore, it should be further understood that the terms "include" and/or "comprise" used in this specification specify the presence of features, steps, operations, devices, components and/or of combinations thereof.

Unless specifically stated otherwise, the relative arrangement of components and steps, numerical expressions, and numerical values set forth in these embodiments do not limit the scope of the present invention. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present invention, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present invention and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present invention: orientation words "inner and outer" refer to the inside and outside relative to the contour of each component.

For ease of description, spatially relative terms, such as "on", "over", "on the upper surface", and "above", can be used here to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotating 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present invention.

As shown in FIG. 1, the present invention provides an apparatus for preparing spherical metal powder based on one-by-one atomization method for uniform droplets, including a housing 19, a crucible 5 disposed in the housing 19, and a collection bin 13 disposed under the housing. The crucible 5 is disposed at an upper portion of the housing 19, and the collection bin 13 is disposed under the crucible 5.

Figure 3:
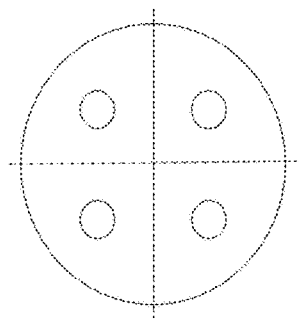
FIG. 3 is a schematic structural diagram of the washer with holes of the present invention.

A transmission rod 3 connected to a piezoelectric ceramic 1 disposed outside the housing 19 is disposed in the crucible 5. A position where the transmission rod 3 is connected to a top portion of the crucible 5 is sealed by using a dynamic sealing ring 2. A lower end of the transmission rod 3 faces towards a center hole at a bottom portion of the crucible 5. A washer 20 with a plurality of small holes is fixed at a bottom portion of the center hole (as shown in FIG. 3, the washer 20 with a plurality of small holes may be a bolt with holes, or a washer with holes made of a high-temperature-resistant and corrosion-resistant material; and the washer 20 with a plurality of small holes is fixed at the bottom portion of the crucible 5 by using a screw 7). A thermocouple is disposed in the crucible 5, and a resistive heater 6 is disposed outside the crucible 5.

A diameter of the center hole of the crucible 5 is greater than that of the small hole of the washer 20 with a plurality of small holes, and the diameter of the small hole of the washer 20 with a plurality of small holes ranges from 0.02 mm to 2.0 mm. A wetting angle between the material of the washer 20 with a plurality of small holes and the melt 4 disposed in the crucible 5 is greater than 90°.

A crucible air inlet 27 extending into the crucible 5 and a crucible exhaust valve 26 are disposed at a top portion of the housing 19. A diffusion pump 23 and a mechanical pump 22 are further disposed on the side wall of the housing 19. A cavity air inlet 21 and a cavity exhaust valve 24 are further disposed on the housing 19. A furnace door 8 is disposed on a side of the housing 19.

The collection bin 13 is fixedly connected with the housing 19 through a support 9. A through ring-shaped pipe 10 is disposed between the housing 19 and the collection bin 13. A turnplate 11 is disposed in the collection bin 13 and right below the through the ring-shaped pipe 10, and the turnplate 11 is connected to a motor 16. A collection tray 15 is disposed at the bottom portion of the collection bin 13, and a collection bin door 14 is disposed on the side of the collection bin 13.

Figure 2:
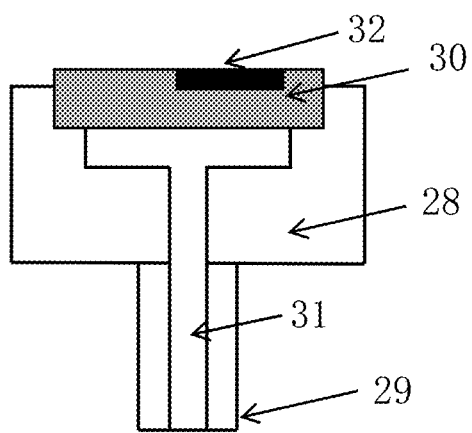
FIG. 2 is a schematic structural diagram of the turnplate of the present invention.

As shown in FIG. 2, the turnplate 11 includes a base, an atomization plane 30, and an air hole 31.

The base is a main structure with a "T-shaped" longitudinal section constituted of an upper receiving portion 28 and a lower support portion 29. An upper surface of the receiving portion 28 is provided with a circular groove having a certain radius which is coaxial with the center of the receiving portion. The base is made of a material with a thermal conductivity of less than 20 W/m/k.

The atomization plane 30 is of a disc structure, matching with the circular groove and in interference fitting with the circular groove. The atomization plane 30 is made of a material with wetting angle less than 90° to an atomized droplet 18. The atomization plane is provided with a concentric circular groove 32 matching with the washer 20 with a plurality of small holes.

The air hole 31 is disposed passing through the receiving portion 28 and the support portion 29. An upper end surface of the air hole 31 is in contact with a lower end surface of the atomization plane 30, and a lower end of the air hole 31 is communicated with the outside.

Induction heating coils 17 are further disposed outside the turnplate 11. The rotational speed of the turnplate 11 is 10000 rpm to 40000 rpm. The heating thickness of the induction heating coil 17 ranges from 5 mm to 20 mm. The induction heating coil 17 is connected to a converter and a regulated power supply that are disposed outside the housing 19, and a voltage of the regulated power supply ranges from 0 V to 50 V.

The piezoelectric ceramic 1, the transmission rod 3, the crucible 5, the resistive heater 6, the washer 20 with a plurality of small holes, the ring-shaped pipe 10, the turnplate 11, the concentric circular groove 32, and the induction heating coil 17 are located on a same axis from top to bottom of the apparatus, so that the droplets may uniformly fall on the center of the turnplate, which is conducive to spreading.

The present invention discloses a method for preparing spherical metal powder based on one-by-one atomization method for uniform droplets by using the apparatus, including the following steps of:

S1. charging: grinding a raw material to a preset average particle size and then charging the raw material into the crucible 5 for sealing; the raw material is charged into the crucible 5 through a furnace door 8, and a quantity of charged raw materials accounts for ¼ to ¾ of a capacity of the crucible 5.

S2. vacuumizing and heating: vacuumizing the crucible 5 and the housing 19 by using the mechanical pump 22 and the diffusion pump 23, and filling the crucible 5 and the housing 19 with a high-purity inert gas; setting a heating power of a resistive heater 6 based on a melting point of the raw material to-be-heated, and after a heating temperature reaches the melting point, completely melting the raw material into a melt 4; manually adjusting a position of the transmission rod 3, until a preset distance exists between the transmission rod 3 and the washer 20 with a plurality of small holes.

S3. induction heating: with a rotational speed preset, enabling the turnplate 11 to rotate at a high speed by using the motor 16, and then heating an upper surface of the turnplate 11, rotating at the high speed, to a temperature higher than a melting-point temperature of a metal material by using the induction heating coil 17; an induction heating voltage of the induction heating coil 17 ranges from 0 V to 50 V, and an induction heating time is 5 min to 15 min.

S4. preparing the powder: firstly, manually adjusting the position of the transmission rod 3 to the preset distance from the washer 20 with a plurality of small holes; secondly, injecting a high-purity inert protective gas into the crucible 5 by using the crucible air inlet 27 disposed on the housing 19 and extending into the crucible 5 to form a positive pressure difference between the inside and the outside of the crucible 5, thereby driving the melt 4 to fill the center hole at the bottom of the crucible 5, wherein a pressure difference between a crucible cavity of the crucible 5 and a cavity of the housing 19 ranges from 0 kPa to 200 kPa; and finally, inputting a pulse signal with a wave pattern to the piezoelectric ceramic 1, wherein the piezoelectric ceramic 1 produces a downward displacement, which is transferred by the transmission rod 3 connected to the piezoelectric ceramic 1 to the molten metal in the vicinity of the center hole, so that the molten metal is ejected from the washer 20 with a plurality of small holes at the bottom portion of the center hole to form uniform droplets 18.

S5. forming the powder: the uniform droplets 18 falling through the ring-shaped pipe 10 and landing freely on the turnplate 11 rotating at a high speed; the molten uniform droplets 18 first dropping in the concentric circular groove 32 in the center of the turnplate 11, and gradually spreading over the groove; because centrifugal force is small at this time, the droplets will not disperse immediately, but spread in a circle on the turnplate 11; when the droplets spread in a certain range and the centrifugal force is large enough, spread metal will disperse on the turnplate 11 in a fiber line shape to an edge of the turnplate 11 under the action of centrifugal force, and finally split into tiny droplets to fly out; the tiny droplets solidifying without a container in a falling process to form the metal powder, and the metal powder falling onto a collection tray 15.

S6. collecting the powder: after the preparation is completed, stopping the heating of the resistive heater 6 and the induction heating coil 17, and stopping the rotation of the turnplate 11, turning off the mechanical pump 22 and the diffusion pump 23, closing the cavity air inlet 21, cavity exhaust valve 24, crucible air inlet 27, and crucible exhaust valve 26, opening the collection bin door 14, and taking out the metal powder 12 in the collection tray 15.

Embodiment 1

Copper metal powder for 3D printing was prepared by using the foregoing apparatus and method, and a specific implementation was as follows:

First, a copper block is crushed into block-shaped particles with a particle size of 2 cm, which is charged into the crucible 5 with a center hole at the bottom; and the quantity of the charged copper particles is ½ of a capacity of the crucible 5. Then a graphite bolt with a plurality of small holes (that is, a washer 20 with a plurality of small holes is a bolt) is installed to the bottom portion of the crucible 5 by using four evenly distributed screws 7 and close the furnace door 8. The crucible cavity 25, the housing 19, and the collection bin 13 are pumped to a low vacuum of 1 Pa to 5 Pa by using the mechanical pump 22, then the crucible cavity 25, the housing 19, and the collection bin 13 are pumped to a high vacuum of 10 Pa to 3 Pa by using the diffusion pump 23, and the crucible cavity 25, the housing 19, and the collection bin 13 are filled with a high-purity inert gas of argon to atmospheric pressure. The resistive heater 6 is electrified, after reaching the melting point of copper, the temperature is continued to rise until overheats by 10° C.; and the temperature is maintained for 30 minutes, so that all the copper particles in the crucible 5 are melted into a melt 4. With a preset speed, the turnplate 11 is enabled to rotate at a high speed by using a motor 16, and then the upper surface of the turnplate 11 rotating at the high speed is heated to a temperature above the melting point of the metal material by using an induction heating coil 17. The transmission rod 3 is manually adjusted until a distance between the transmission rod 3 and the washer 20 with a plurality of small holes is about 2 cm to 5 cm. The crucible air inlet 27 and the crucible exhaust valve 26 is opened, and the crucible cavity 25 is filled with a high-purity inert gas of argon, making the pressure difference between the crucible cavity 25 and the housing 19 to reach 50 kPa.

Secondly, a square-wave pulse signal is input to the piezoelectric ceramic 1, and the piezoelectric ceramic 1 drove the transmission rod 3 to vibrate downwards to squeeze the melt 4. The melt 4 is ejected from the small holes of the washer 20 with a plurality of small holes made of graphite to form droplets 18. The droplets 18 freely fall through a ring-shaped pope 10 into a concentric circular groove 32 in the center of the turnplate 11 that rotates at the high speed, and gradually spread over the groove. Under the action of centrifugal force, the droplets 18 are broken into smaller tiny droplets, the tiny droplets solidified without a container in the falling process to form metal powder 12 which fall into the collection tray 15 (the collection tray may be a ring-shaped disc or a disc). After the preparation is completed, the heating of the resistive heater 6 and the induction heating coil 17 are stopped, the rotation of the turnplate 11 is stopped, the mechanical pump 22 and the diffusion pump 23 are turned off, and the cavity air inlet 21, the cavity exhaust valve 24, the crucible air inlet 27, and the crucible exhaust valve 26 are closed, thereby opening the collection bin door 14 to take out the metal powder 12 in the collection tray 15.

Figure 4:
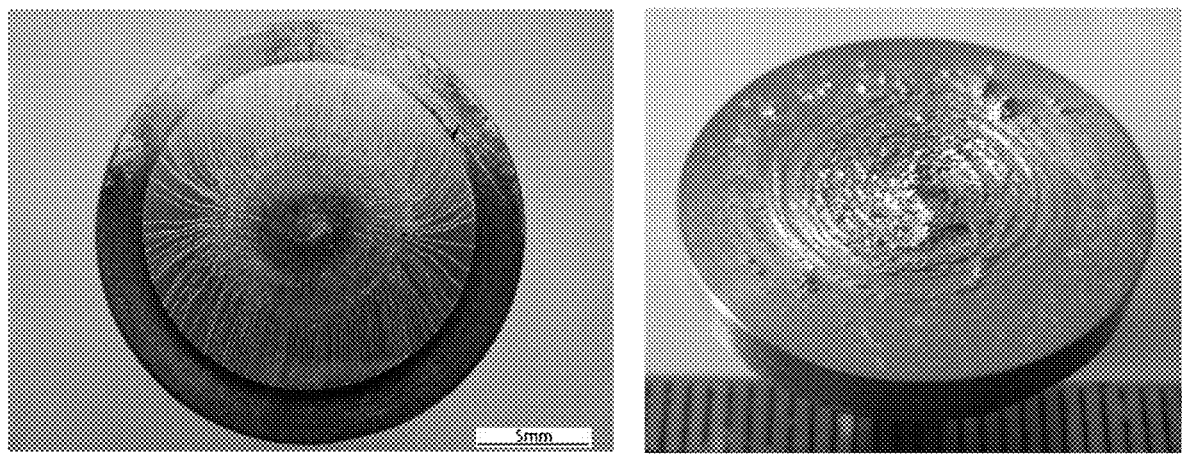
FIG. 4 is a diagram of comparison between a surface of the turnplate in the present invention after an experiment and a surface of an original turnplate after an experiment; panel (a) is a fibrously splitting surface of the turnplate, and panel (b) is a surface of the turnplate in the prior art.

As shown in FIG. 4, panel (b) is an atomization plate obtained after atomization in the prior art. Because the wettability of a material of the atomization plate and the material of the prepared metal powder is excessively small, and the temperature of the turnplate during the atomization process is too low, a liquid is split in a film shape, and a relatively thick solidified liquid film appears on an atomized surface. The surface of the liquid film is very rough, which is not conducive to subsequent further atomization of metal droplets, thereby seriously affecting atomization effect and atomization efficiency. FIG. 4 panel (a) is an atomized surface obtained by using the method in the present invention. It can be seen that an atomization mode is transformed into an obvious fibrously split mode. The linear split mode greatly improves fineness and production efficiency of the metal powder.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

The invention claimed is:

1. An apparatus for preparing spherical metal powder, comprising a housing (19), a crucible (5) disposed in the housing (19), and a collection bin (13) disposed under the housing,
wherein:
the crucible (5) is disposed at an upper portion of the housing (19), and the collection bin (13) is disposed under the crucible (5);
a transmission rod (3) connected to a piezoelectric ceramic (1) disposed outside the housing (19) is disposed in the crucible (5);
a position where the transmission rod (3) is connected to a top portion of the crucible (5) is sealed by a dynamic sealing ring (2);
a lower end of the transmission rod (3) faces towards a center hole at a bottom portion of the crucible (5), and a perforated plate (20) having a plurality of holes is disposed at a bottom portion of the center hole; a resistive heater (6) is disposed about an outer wall of the crucible (5);
a crucible air inlet (27) extending into the crucible (5) and a crucible exhaust valve (26) are disposed at a top portion of the housing (19);
a diffusion pump (23) and a mechanical pump (22) are disposed on a side wall of the housing (19);
a cavity air inlet (21) and a cavity exhaust valve (24) are disposed on the housing (19); and a furnace door (8) is installed on the housing (19); and
the collection bin (13) is fixedly connected with the housing (19) through a support (9);
a through ring-shaped pipe (10) is disposed between the housing (19) and the collection bin (13);
a turnplate (11) is disposed in the collection bin (13) and below the through ring-shaped pipe (10); the turnplate (11) is connected to a motor (16); a collection tray (15) is disposed at a bottom of the collection bin (13);
a collection bin door (14) is installed on a side of the collection bin (13);
wherein the turnplate (11) comprises:
a T-shaped base having a receiving portion (28) connected with a support portion (29); an upper surface of the receiving portion (28) is provided with a circular groove with a certain radius which is coaxial with the center of the receiving portion; wherein the base is made of a material with a thermal conductivity of less than 20 W/m/k;
an atomization plane (30) with a disc structure, matching in interference fitting with the circular groove in the receiving portion; wherein the atomization plane (30) is made of a material having a wetting angle of less than 90° to an atomized droplet (18); a center of the turnplate of the atomization plane is provided with a concentric circular groove (32) disposed below the perforated plate (20);
during operation, molten droplets (18) drop from the crucible through the ring-shaped pipe (10) onto the concentric circular groove (32) in the center of the rotating turnplate (11), spread across the atomization plane under a centrifugal force generated by the rotation of the turnplate, and drop into the collection tray; and
an induction heating coil (17) is disposed outside the turnplate (11), configured to heat an upper surface of the turnplate (11),
wherein the piezoelectric ceramic (1), the transmission rod (3), the crucible (5), the perforated plate (20), the ring-shaped pipe (10), the turnplate (11), the concentric circular groove (32), and the induction heating coil (17) are located on a same axis extending from top to bottom of the apparatus, and
wherein, during operation, a material is melted in the crucible, the induction heating coil heats an upper surface of the turnplate to a temperature higher than a melting point of the metal material, molten droplets drop from the crucible through the ring-shaped pipe (10) onto the concentric circular groove (32) in the center of the rotating turnplate (11), spread across the atomization plane under a centrifugal force generated by the rotation of the turnplate, and drop into the collection tray.

2. The apparatus according to claim 1, wherein a diameter of the center hole of the crucible (5) is greater than that of the small hole of the perforated plate (20), and the plurality of holes in the perforated plate have diameters ranging from 0.02 mm to 2.0 mm.

3. The apparatus according to claim 1, wherein a wetting angle between a material of the perforated plate (20) and a molten material (4) in the crucible (5) is greater than 90°.

4. The apparatus according to claim 1, wherein a rotational speed of the turnplate (11) is 10000 rpm to 40000 rpm.

5. The apparatus according to claim 1, wherein a heating thickness of the induction heating coil (17) ranges from 5 mm to 20 mm, the induction heating coil (17) is connected with a converter and a regulated power supply that are disposed outside the housing (19).

6. A method for preparing spherical metal powder using the apparatus according to claim 1, comprising the following steps:
- S1. charging: grinding a raw material to a preset average particle size and then charging the raw material into the crucible (5) for sealing;
- S2. vacuumizing and heating: vacuumizing the crucible (5) and the housing (19) by using the mechanical pump (22) and the diffusion pump (23), and filling the crucible (5) and the housing (19) with a high-purity inert gas; setting a heating power of a resistive heater (6) based on a melting point of the raw material to-be-heated, and after a heating temperature reaches the melting point, keeping the temperature to melt the raw material into a melt (4) completely; manually adjusting a position of the transmission rod (3), until a preset distance exists between the transmission rod (3) and the perforated plate (20);
- S3 induction heating: with a rotational speed preset, enabling the turnplate (11) to rotate at a high speed by using the motor (16), followed by heating an upper surface of the turnplate (11) rotating at the high speed to a temperature higher than the melting-point of a metal material by using the induction heating coil (17);
- S4. preparing the powder: firstly, manually adjusting the position of the transmission rod (3) to the preset distance from the perforated plate (20); secondly, injecting a high-purity inert protective gas into the crucible (5) by using the crucible air inlet (27) disposed on the housing (19) and extending into the crucible (5), to form a positive pressure difference between the inside and the outside of the crucible (5), thereby driving the melt (4) to fill the center hole at the bottom of the crucible (5); and finally, inputting a pulse signal with a wave pattern to the piezoelectric ceramic (1), wherein the piezoelectric ceramic (1) produces a downward displacement that is transferred by the transmission rod (3) connected to the piezoelectric ceramic (1) to the molten metal in the vicinity of the center hole, so that the molten metal is ejected from the perforated plate (20) at the bottom of the center hole to form uniform droplets (18);
- S5. forming the powder: the uniform droplets (18) dropping freely on the turnplate (11) rotating at a high speed through the ring-shaped pipe (10); the molten uniform droplets (18) first dropping in the concentric circular groove (32) in the center of the turnplate (11), and gradually spreading over the groove; because centrifugal force is small at this time, the droplets will not disperse immediately, but spread in a circle on the turnplate (11); when the droplets spread in a certain range and the centrifugal force is large enough, spread metal will disperse on the turnplate (11) in a fiber line shape to an edge of the turnplate (11) under the action of centrifugal force, and finally split into tiny droplets to fly out; the tiny droplets solidifying without a container in a falling process to form spherical metal powder (12), and the metal powder falling onto the collection tray (15); and
- S6. collecting the powder: after the preparation is completed, stopping the heating of the resistive heater (6) and the induction heating coil (17), and stopping the rotation of the turnplate (11), turning off the mechanical pump (22) and the diffusion pump (23), closing the cavity air inlet (21), cavity exhaust valve (24), crucible air inlet (27), and crucible exhaust valve (26), opening the collection bin door (14), and taking out the spherical metal powder (12) in the collection tray (15).

7. The method according to claim 6, wherein the raw material is charged into the crucible (5) through the furnace door (8), and a quantity of the charged raw materials accounts for ¼ to ¾ of a capacity of the crucible (5).

8. The method according to claim 6, wherein a pressure difference between a crucible cavity of the crucible (5) and a cavity of the housing (19) ranges from 50 kPa to 200 kPa.

9. A method for preparing spherical metal powder using the apparatus according to claim 2, comprising the following steps:
- S1. charging: grinding a raw material to a preset average particle size and then charging the raw material into the crucible (5) for sealing;
- S2. vacuumizing and heating: vacuumizing the crucible (5) and the housing (19) by using the mechanical pump (22) and the diffusion pump (23), and filling the crucible (5) and the housing (19) with a high-purity inert gas; setting a heating power of a resistive heater (6) based on a melting point of the raw material to-be-heated, and after a heating temperature reaches the melting point, keeping the temperature to melt the raw material into a melt (4) completely; manually adjusting a position of the transmission rod (3), until a preset distance exists between the transmission rod (3) and the perforated plate (20);
- S3 induction heating: with a rotational speed preset, enabling the turnplate (11) to rotate at a high speed by using the motor (16), followed by heating an upper surface of the turnplate (11) rotating at the high speed to a temperature higher than the melting-point of a metal material by using the induction heating coil (17);
- S4. preparing the powder: firstly, manually adjusting the position of the transmission rod (3) to the preset distance from the perforated plate (20); secondly, injecting a high-purity inert protective gas into the crucible (5) by using the crucible air inlet (27) disposed on the housing (19) and extending into the crucible (5), to form a positive pressure difference between the inside and the outside of the crucible (5), thereby driving the melt (4) to fill the center hole at the bottom of the crucible (5); and finally, inputting a pulse signal with a wave pattern to the piezoelectric ceramic (1), wherein the piezoelectric ceramic (1) produces a downward displacement that is transferred by the transmission rod (3) connected to the piezoelectric ceramic (1) to the molten metal in the vicinity of the center hole, so that the molten metal is ejected from the perforated plate (20) at the bottom of the center hole to form uniform droplets (18);
- S5. forming the powder: the uniform droplets (18) dropping freely on the turnplate (11) rotating at a high speed through the ring-shaped pipe (10); the molten uniform droplets (18) first dropping in the concentric circular groove (32) in the center of the turnplate (11), and gradually spreading over the groove; because centrifugal force is small at this time, the droplets will not disperse immediately, but spread in a circle on the turnplate (11); when the droplets spread in a certain range and the centrifugal force is large enough, spread metal will disperse on the turnplate (11) in a fiber line shape to an edge of the turnplate (11) under the action of centrifugal force, and finally split into tiny droplets to fly out; the tiny droplets solidifying without a container in a falling process to form spherical metal powder (12), and the metal powder falling onto the collection tray (15); and S6. collecting the powder: after the preparation is completed, stopping the heating of the resistive heater (6) and the induction heating coil (17), and stopping the rotation of the turnplate (11), turning off the mechanical pump (22) and the diffusion pump (23), closing the cavity air inlet (21), cavity exhaust valve (24), crucible air inlet (27), and crucible exhaust valve (26), opening the collection bin door (14), and taking out the spherical metal powder (12) in the collection tray (15).

10. A method for preparing spherical metal powder using the apparatus according to claim 3, comprising the following steps:

S1. charging: grinding a raw material to a preset average particle size and then charging the raw material into the crucible (5) for sealing;

S2. vacuumizing and heating: vacuumizing the crucible (5) and the housing (19) by using the mechanical pump (22) and the diffusion pump (23), and filling the crucible (5) and the housing (19) with a high-purity inert gas; setting a heating power of a resistive heater (6) based on a melting point of the raw material to-be-heated, and after a heating temperature reaches the melting point, keeping the temperature to melt the raw material into a melt (4) completely; manually adjusting a position of the transmission rod (3), until a preset distance exists between the transmission rod (3) and the perforated plate (20);

S3 induction heating: with a rotational speed preset, enabling the turnplate (11) to rotate at a high speed by using the motor (16), followed by heating an upper surface of the turnplate (11) rotating at the high speed to a temperature higher than the melting-point of a metal material by using the induction heating coil (17);

S4. preparing the powder: firstly, manually adjusting the position of the transmission rod (3) to the preset distance from the perforated plate (20); secondly, injecting a high-purity inert protective gas into the crucible (5) by using the crucible air inlet (27) disposed on the housing (19) and extending into the crucible (5), to form a positive pressure difference between the inside and the outside of the crucible (5), thereby driving the melt (4) to fill the center hole at the bottom of the crucible (5); and finally, inputting a pulse signal with a wave pattern to the piezoelectric ceramic (1), wherein the piezoelectric ceramic (1) produces a downward displacement that is transferred by the transmission rod (3) connected to the piezoelectric ceramic (1) to the molten metal in the vicinity of the center hole, so that the molten metal is ejected from the perforated plate (20) at the bottom of the center hole to form uniform droplets (18);

S5. forming the powder: the uniform droplets (18) dropping freely on the turnplate (11) rotating at a high speed through the ring-shaped pipe (10); the molten uniform droplets (18) first dropping in the concentric circular groove (32) in the center of the turnplate (11), and gradually spreading over the groove; because centrifugal force is small at this time, the droplets will not disperse immediately, but spread in a circle on the turnplate (11); when the droplets spread in a certain range and the centrifugal force is large enough, spread metal will disperse on the turnplate (11) in a fiber line shape to an edge of the turnplate (11) under the action of centrifugal force, and finally split into tiny droplets to fly out; the tiny droplets solidifying without a container in a falling process to form spherical metal powder (12), and the metal powder falling onto the collection tray (15); and S6. collecting the powder: after the preparation is completed, stopping the heating of the resistive heater (6) and the induction heating coil (17), and stopping the rotation of the turnplate (11), turning off the mechanical pump (22) and the diffusion pump (23), closing the cavity air inlet (21), cavity exhaust valve (24), crucible air inlet (27), and crucible exhaust valve (26), opening the collection bin door (14), and taking out the spherical metal powder (12) in the collection tray (15).

11. A method for preparing spherical metal powder using the apparatus according to claim 4, comprising the following steps:

S1. charging: grinding a raw material to a preset average particle size and then charging the raw material into the crucible (5) for sealing;

S2. vacuumizing and heating: vacuumizing the crucible (5) and the housing (19) by using the mechanical pump (22) and the diffusion pump (23), and filling the crucible (5) and the housing (19) with a high-purity inert gas; setting a heating power of a resistive heater (6) based on a melting point of the raw material to-be-heated, and after a heating temperature reaches the melting point, keeping the temperature to melt the raw material into a melt (4) completely; manually adjusting a position of the transmission rod (3), until a preset distance exists between the transmission rod (3) and the perforated plate (20);

S3 induction heating: with a rotational speed preset, enabling the turnplate (11) to rotate at a high speed by using the motor (16), followed by heating an upper surface of the turnplate (11) rotating at the high speed to a temperature higher than the melting-point of a metal material by using the induction heating coil (17);

S4. preparing the powder: firstly, manually adjusting the position of the transmission rod (3) to the preset distance from the perforated plate (20); secondly, injecting a high-purity inert protective gas into the crucible (5) by using the crucible air inlet (27) disposed on the housing (19) and extending into the crucible (5), to form a positive pressure difference between the inside and the outside of the crucible (5), thereby driving the melt (4) to fill the center hole at the bottom of the crucible (5); and finally, inputting a pulse signal with a wave pattern to the piezoelectric ceramic (1), wherein the piezoelectric ceramic (1) produces a downward displacement that is transferred by the transmission rod (3) connected to the piezoelectric ceramic (1) to the molten metal in the vicinity of the center hole, so that the molten metal is ejected from the perforated plate (20) at the bottom of the center hole to form uniform droplets (18);

S5. forming the powder: the uniform droplets (18) dropping freely on the turnplate (11) rotating at a high speed through the ring-shaped pipe (10); the molten uniform droplets (18) first dropping in the concentric circular groove (32) in the center of the turnplate (11), and gradually spreading over the groove; because centrifugal force is small at this time, the droplets will not disperse immediately, but spread in a circle on the turnplate (11); when the droplets spread in a certain range and the centrifugal force is large enough, spread metal will disperse on the turnplate (11) in a fiber line shape to an edge of the turnplate (11) under the action of centrifugal force, and finally split into tiny droplets to fly out; the tiny droplets solidifying without a container in a falling process to form spherical metal powder (12), and the metal powder falling onto the collection tray (15); and S6. collecting the powder: after the preparation is completed, stopping the heating of the resistive heater (6) and the induction heating coil (17), and stopping the rotation of the turnplate (11), turning off the mechanical pump (22) and the diffusion pump (23), closing the cavity air inlet (21), cavity exhaust valve (24), crucible air inlet (27), and crucible exhaust valve (26), opening the collection bin door (14), and taking out the spherical metal powder (12) in the collection tray (15).

12. A method for preparing spherical metal powder by using the apparatus according to claim 5, comprising the following steps:

S1. charging: grinding a raw material to a preset average particle size and then charging the raw material into the crucible (5) for sealing;

S2. vacuumizing and heating: vacuumizing the crucible (5) and the housing (19) by using the mechanical pump (22) and the diffusion pump (23), and filling the crucible (5) and the housing (19) with a high-purity inert gas; setting a heating power of a resistive heater (6) based on a melting point of the raw material to-be-heated, and after a heating temperature reaches the melting point, keeping the temperature to melt the raw material into a melt (4) completely; manually adjusting a position of the transmission rod (3), until a preset distance exists between the transmission rod (3) and the perforated plate (20);

S3 induction heating: with a rotational speed preset, enabling the turnplate (11) to rotate at a high speed by using the motor (16), followed by heating an upper surface of the turnplate (11) rotating at the high speed to a temperature higher than the melting-point of a metal material by using the induction heating coil (17);

S4. preparing the powder: firstly, manually adjusting the position of the transmission rod (3) to the preset distance from the perforated plate (20); secondly, injecting a high-purity inert protective gas into the crucible (5) by using the crucible air inlet (27) disposed on the housing (19) and extending into the crucible (5), to form a positive pressure difference between the inside and the outside of the crucible (5), thereby driving the melt (4) to fill the center hole at the bottom of the crucible (5); and finally, inputting a pulse signal with a wave pattern to the piezoelectric ceramic (1), wherein the piezoelectric ceramic (1) produces a downward displacement that is transferred by the transmission rod (3) connected to the piezoelectric ceramic (1) to the molten metal in the vicinity of the center hole, so that the molten metal is ejected from the perforated plate (20) at the bottom of the center hole to form uniform droplets (18);

S5. forming the powder: the uniform droplets (18) dropping freely on the turnplate (11) rotating at a high speed through the ring-shaped pipe (10); the molten uniform droplets (18) first dropping in the concentric circular groove (32) in the center of the turnplate (11), and gradually spreading over the groove; because centrifugal force is small at this time, the droplets will not disperse immediately, but spread in a circle on the turnplate (11); when the droplets spread in a certain range and the centrifugal force is large enough, spread metal will disperse on the turnplate (11) in a fiber line shape to an edge of the turnplate (11) under the action of centrifugal force, and finally split into tiny droplets to fly out; the tiny droplets solidifying without a container in a falling process to form spherical metal powder (12), and the metal powder falling onto the collection tray (15); and S6. collecting the powder: after the preparation is completed, stopping the heating of the resistive heater (6) and the induction heating coil (17), and stopping the rotation of the turnplate (11), turning off the mechanical pump (22) and the diffusion pump (23), closing the cavity air inlet (21), cavity exhaust valve (24), crucible air inlet (27), and crucible exhaust valve (26), opening the collection bin door (14), and taking out the spherical metal powder (12) in the collection tray (15).

* * * * *